United States Patent [19]
Iihoshi et al.

[11] Patent Number: 6,052,632
[45] Date of Patent: Apr. 18, 2000

[54] NETWORK SYSTEM FOR VEHICLE-MOUNTED ELECTRONIC DEVICES AND VEHICLE-MOUNTED OPERATING SYSTEM USED THEREIN

[75] Inventors: Akira Iihoshi; Yoshiaki Sakagami, both of Wako, Japan

[73] Assignee: Honda Giken Kogyo Kabushiki Kaisha, Tokyo, Japan

[21] Appl. No.: 09/026,950

[22] Filed: Feb. 20, 1998

[30] Foreign Application Priority Data

Feb. 21, 1997 [JP] Japan ................................... 9-038061

[51] Int. Cl.$^7$ ........................................................ G06F 7/00
[52] U.S. Cl. .................. 701/36; 701/24; 701/29; 701/33; 364/131
[58] Field of Search ................... 701/22, 24, 29, 701/33, 34, 35, 36; 364/131, 133, 134; 395/800.32, 800.34

[56] References Cited

U.S. PATENT DOCUMENTS

4,821,266  4/1989  Ohm et al. ............................. 714/736
5,640,584  6/1997  Kandasamy et al. ................. 395/800.3

*Primary Examiner*—William A. Cuchlinski, Jr.
*Assistant Examiner*—Gertrude Arthur
*Attorney, Agent, or Firm*—Lyon & Lyon LLP

[57] ABSTRACT

A network system includes a plurality of vehicle-mounted, microcomputer-based electronic devices each having & distributed operating system for performing data communication and distributed processes among the electronic devices. By virtue of the distributed operating system, information resources and hardware resources can be used in common by two or more of the vehicle-mounted electronic devices. Thus the network system has a higher level of network transparency. Because the electronic devices can operate independently and they are interconnected by a common interface called network, a revision to the program of one of the electronic devices or entry of a new electronic device to the network system does not induce tedious and time-consuming version-up of the program of any other electronic device.

9 Claims, 8 Drawing Sheets

NETWORK SYSTEM FOR VEHICLE-MOUNTED ELECTRONIC DEVICES AND VEHICLE-MOUNTED OPERATING SYSTEM USED THEREIN

BACKGROUND OF THE INVENTION

1. Field of the Invention

The present invention relates to a network system including a plurality of vehicle-mounted, microcomputer-based electronic devices interconnected by a transmission channel, and an operating system used in the network system.

2. Description of the Prior Art

A Network systems having a plurality vehicle-mounted, microcomputer-based electronic devices interconnected by a serial transmission bus are known in which data communication is performed in accordance with programs (application programs) written in advance in the electronic devices.

A vehicle-mounted electronic device at the transmit side sends or transmits data to a destination vehicle-mounted electronic device with an identifier affixed to the data. The destination vehicle-mounted electronic device at the receive side performs various processing operations on the basis of the data received. Control is also performed in the same manner as described above. More specifically, a vehicle-mounted electronic device at the transmit side transfers data to be transmitted as control data, and a vehicle-mounted electronic device at the receive side changes the control routine on the basis of the control data.

The foregoing operations at the respective sides are mutually determined in advance, and so when the program at one side (transmit side or receive side) is changed or revised, the program at the other side should be revised. Especially, when a new vehicle-mounted electronic device is incorporated in the network system, data communication is disenabled until the necessary revision is made to the program of any one of the existing vehicle-mounted electronic devices.

Revision or version-up of the programs is tedious and time-consuming from the viewpoint of configuration of a network system for vehicle-mounted electronic devices.

High-speed road-running vehicles generally require various improvements to provide improved reliability and comfortableness. To cope with this requirement, a now vehicle-mounted electronic device equipped with a microcomputer is installed, an optional part or parts are added, or the program of each individual vehicle-mounted electronic device is revised to deal with improvements in any of the existing vehicle-mounted equipments which may be proposed as the technology advances.

Differing from a general computer network system consisting of identical personal computers, the network system for vehicle-mounted electronic devices requires laborious version-up of a program incorporated in each of the existing vehicle-mounted electronic devices to cope with entry of a new vehicle-mounted electronic device.

Due to difficulties, there has been a strong demand for a network system for vehicle-mounted electronic devices which is capable of accepting entry of a now vehicle-mounted electronic device without requiring any revision to the existing programs, and which enables the electronic devices to use information resources and hardware resources in common to deal with the underlying process complexity.

SUMMARY OF THE INVENTION

In one aspect the present invention provides a network system for a vehicle, comprising; a plurality of electronic devices mounted on the vehicle and interconnected by a transmission channel, each of the vehicle-mounted electronic devices having a microprocessor and containing a distributed operating system for performing data communication and distributed processes among the vehicle-mounted electronic devices.

By virtue of the distributed operating system contained in each of the vehicle-mounted electronic devices, information resources and hardware resources can be used in common by two or more of the vehicle-mounted electronic devices, and a given data item can be transmitted among the vehicle-mounted electronic devices with improved network transparency.

The distributed operating system improves the reliability of the network system. For instance, by preparing a copy of the original data or employing multiprocessing, the risk of system failure can be dispersed or reduced.

The distributed operating system also improves the performance of the network system. For example, by process migration to disperse the loads or by data caching, the execution time of a program can be reduced with the result that the throughput of the network system is improved.

The network system of the present invention has a high level of scalability. Because all of the microcomputers can operate independently from one another and they are interconnected by a common interface called "network", changes to the existing functions or addition of a new function can be made easily with increased flexibility. Each time one microcomputer is added to the network system, the performance of the network system is improved as if a new storage device or memory is added to increase the storage capacity. The foregoing performance improvement can be attained without requiring any change or revision to the system and application programs.

In the network system data about vehicles including the own velocity of the vehicle are routed within the network system, with tags indicating shared data being affixed to the data, and stored in respective internal memories of the microprocessors in the vehicle-mounted electronic devices to thereby form virtual distributed shared memories.

The virtual distributed shared memories can be used in the same semantics as the shared memories in a centered control type network system. It is therefore possible to virtually build up shared memories in the distributed system when there is no physically shared memory provided. Additionally, since an addressing part or space extends over the network system, the network transparency at the programming level is improved. The network system having shared memories used in common by a plurality of processors shows good adaptability relative to multiprocessors of the shared memory type, and programs dealing with shared data can be prepared naturally and easily. Furthermore, the available physical storage area or capacity increases with an increase in number of microcomputers connected to the network. The virtual storage system ensures access to the data at higher efficiency than as done by an input/output instruction.

The network system preferably has distributed shared memories for storing therein at least shared data about vehicles including the own velocity of the vehicle. The distributed shared memories have respective predetermined storage areas accessible from the vehicle-mounted electronic devices. Because only the predetermined storage areas of the distributed shared memories are accessible from the vehicle-mounted electronic devices, data items stored in other storage areas than the predetermined storage areas are protected against unintentional rewriting.

In the network system, the distributed operating system deals with a system call from another task invoking a change in the state of an own task such that the system call becomes effective only when said another task has a higher level of access right than the own task.

Even when a newly added vehicle-mounted electronic device or a modified one of the existing vehicle-mounted electronic devices unintentionally issues a system call (service call) to stop execution of a given task, the task will continue as long as it has a higher level of access right than the unintentionally issued task stop system call.

The distributed operating system may deal with a system call from another node invoking a change in the state of a task in the own node such that the system call becomes effective only when said another node has a higher level of access right than the own node. In this case, the node means each individual vehicle-mounted electronic device in the network system and has an given access right.

In the case where a new node is to be developed or added, effects of the newly developed or added node on the network system can be estimated in advance only by checking the access right of the new node. Additionally, even when a task stop system (service call) is unintentionally issued from a newly added vehicle-mounted electronic device or a modified one of the existing vehicle-mounted electronic device, the task will continue as long as it has a higher level of access right than the unintentionally issued task stop system call.

The distributed operating system may have a system call function assigned distributively to each node of the network system. This arrangement makes it possible to minimize the number of execution parts or units required for the execution the system call. Thus, even in a small-sized node a large number of system calls can be dealt with, and so a program can be prepared with a great degree of freedom.

When used in a vehicle having an adaptive cruise control function, the network system preferably has distributed shared memories for storing therein at least shared data about vehicles including the own velocity of the vehicle. One of the vehicle-mounted electronic devices is capable of calculating at least a velocity of the preceding vehicle and a vehicle-to-vehicle distance between the vehicle and the preceding vehicle. The last-mentioned one vehicle-mounted electronic device stores data about the calculated preceding vehicle's velocity and vehicle-to-vehicle distance in the distributed shared memories to secure access to the data from any other vehicle-mounted electronic device, and is capable of performing distributed processes to calculate, on the basis of the own velocity, preceding vehicle's velocity and vehicle-to-vehicle distance stored in the distributed shared memories, a gear set and a throttle opening both required for enabling the vehicle to cruise after the preceding vehicle with a predetermined vehicle-to-vehicle distance kept between itself and the preceding vehicle.

The adaptive cruise control is a control which is initiated when there is a vehicle running ahead of the own vehicle at speeds below a predetermined speed while the own vehicle is running in the auto-cruise mods. The control is performed to enable the own vehicle to cruise after the preceding vehicle while keeping a predetermined vehicle-to-vehicle distance. The adaptive cruise control requires high reliability and enhanced performance characteristics because the accelerator pedal is kept free from depression by the driver throughout the auto-cruise operation, and because the presence of a neighboring vehicle or vehicles other than the preceding vehicle must be taken into consideration.

According to the network system of the present invention, distributed processes calculate, on the basis of the own velocity, preceding vehicle's velocity and vehicle-to-vehicle distance stored in the distributed shared memories, a gear set and a throttle opening both required for enabling the vehicle to cruise after the preceding vehicle with a predetermined vehicle-to-vehicle distance kept between itself and the preceding vehicle. With this distributed processes, the reliability and performance characteristics of the auto-cruse mods are greatly improved. A further improvement in the reliability can be attained by, for example, preparing a copy of the data or employing multiprocessing to thereby disperse or reduce the risk of system failure. Additionally, by process migration or data caching performed in the distributed processes to disperse or reduce the loads, the execution time of a program can be reduced with the result that the throughput of the system is improved. The adapted cruise control function of this invention will exert no adverse effect on the drivability of the neighboring vehicle.

In another aspect the invention provides an operating system for use in a network system having a plurality of electronic devices mounted on a vehicle and interconnected by a transmission channel, each of the vehicle-mounted electronic devices having a microcomputer, the operating system comprising: a system call containing a parameter assigned to a travel distance of the vehicle.

In still another aspect the invention provides an operating system for use in a network system having a plurality of electronic devices mounted on a vehicle and interconnected by a transmission channel, each of the vehicle-mounted electronic devices having a microcomputer, the operating system comprising: a system call containing a parameter assigned to a running velocity of the vehicle.

The operating system may be a distributed operating system incorporated in each of the vehicle-mounted electronic devices in the network system.

The above and other object, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION OF THE INVENTION

Figure 1:
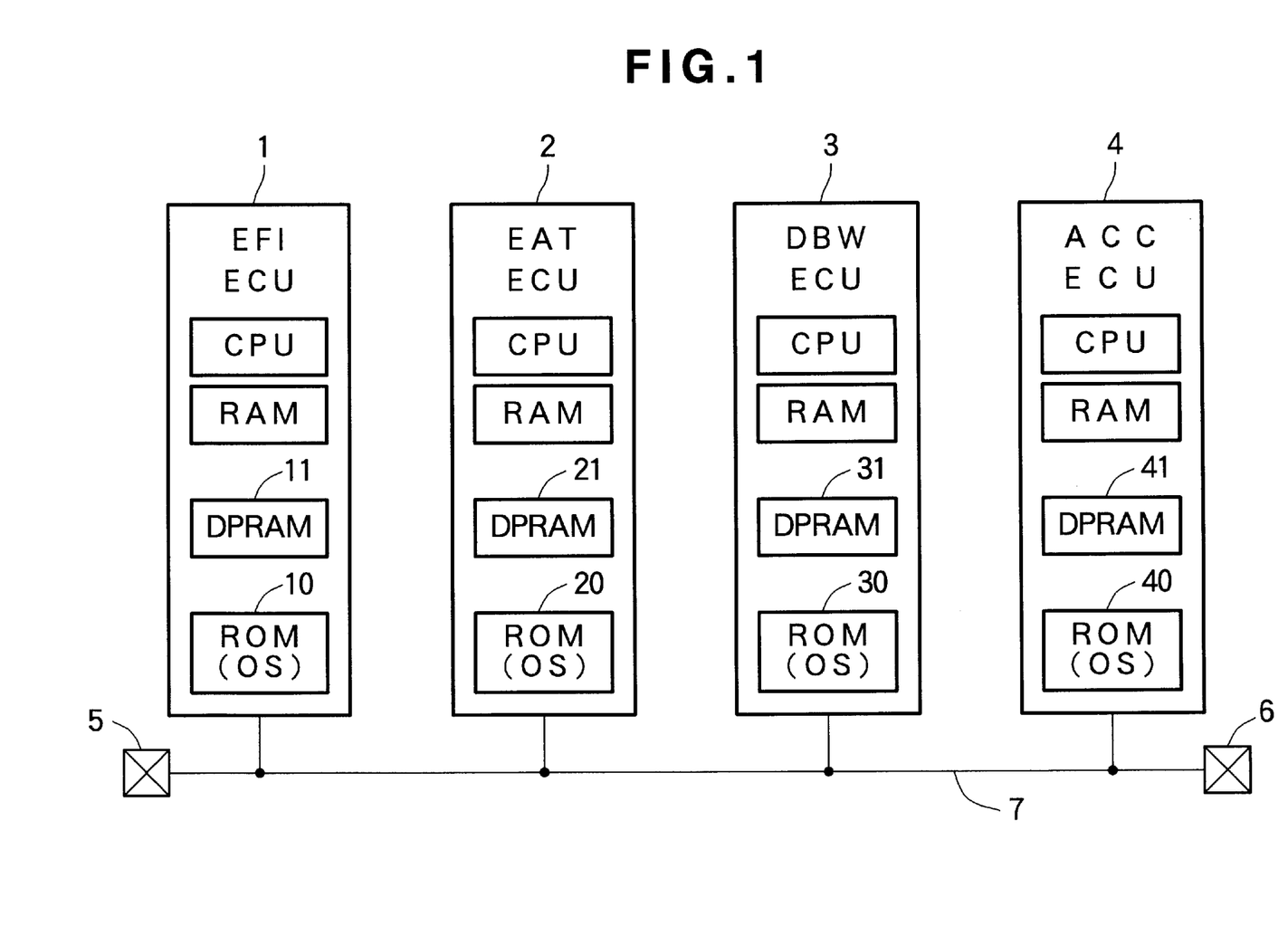
FIG. 1 is block diagram showing the general configuration of a network system for vehicle-mounted electronic devices according to the present inventions

FIG. 1 shows in block diagram the general configuration of a network system for vehicle-mounted electronic devices embodying the present invention.

The network system is comprised of a plurality of vehicle-mounted electronic devices (four being shown) 1, 2, 3, 4 interconnected by a serial transmission bus 7 (formed by harnesses or optical fibers as transmission lines). The serial transmission bus 7 is also connected to a vehicle-mounted electronic device 8 (FIG. 6) for calculating the vehicle velocity, and a vehicle-mounted electronic device 9 (FIG. 6) for a vehicle-mounted navigation system. Reference numerals 5 and 6 shown in FIG. 1 are terminals.

The vehicle-mounted electronic device 1 is an electronic control unit for electronic fuel injection (EFI ECU) of an engine of the motor vehicle. This electronic device 1 is a microcomputer-based electronic device and includes a central processing unit (CPU), a random access memory (RAM), a readonly memory (ROM) and a dual-port random access memory (DPRAM) 11. The ROM stores therein an operating system (OS) 10. The vehicle-mounted electronic device 1 is electrically connected to a fuel injection system (not shown) of the motor vehicle. The electronic device 1 has a control program adapted to be executed to perform a series of tasks required for the control of the fuel injection system.

The vehicle-mounted electronic device 2 is an electronic control unit for electronic automatic transmission (EAT ECU), which controls the gear shift of an automatic transmission of the motor vehicle. This electronic device 2 is a microcomputer-based electronic device and includes a CPU, an RAM, an ROM and a DPRAM 21. The ROM stores therein an OS 20. The vehicle-mounted electronic device 2 is electrically connected to a shift lever and the automatic transmission.

The vehicle-mounted electronic device 2 has a control program adapted to be executed to perform, for example, a task T1 for calculating an optimum gear set (gear ratio) based on various sensing data, and a task T2 for controlling a solenoid valve to shift the gears.

The vehicle-mounted electronic device 3 is an electronic control unit for drive-by-wire (DBW ECU), which controls the throttle opening in accordance with an angle of depression of the accelerator pedal detected by a sensor (not shown). This electronic device 3 is a microcomputer-based electronic device and includes a CPU, an RAM, an ROM and a DPRAM 31. The ROM stores therein an OS 30. The vehicle-mounted electronic device 3 is electrically connected to a throttle and the sensor for detecting the depression angle of the accelerator pedal.

The vehicle-mounted electronic device 3 has a control program adapted to be executed to perform, for example, a task B (FIG. 5) for calculating a throttle opening corresponding to a depression angle of the accelerator pedal detected by the sensor, and a tack A (FIG. 5) for controlling operation of a throttle-opening regulating motor (not shown) to realize the calculated throttle opening.

The vehicle-mounted electronic device 4 is an electronic control unit for adaptive cruise control (ACC ECU), which calculates a gear set (gear ratio) and a throttle opening on the basis of the own velocity, i.e., the velocity of a vehicle on which the electronic device 4 is mounted, the velocity of the preceding vehicle, and the distance between these two vehicles, so as to enable the vehicle to cruise after the preceding vehicle with a predetermined distance (vehicle-to-vehicle distance) kept therebetween. This electronic device 4 is a microcomputer-based electronic device and includes a CPU, an RAM, an ROM and a DPRAM 41. The ROM stores therein an OS 40. The vehicle-mounted electronic device 4 is electrically connected to a radar distance measuring equipment (not shown) arranged to measure the velocity of the preceding vehicle and the vehicle-to-vehicle distance using a radar. The electronic device 4 may be also connected to an operation lamp and acceleration and deceleration switches (neither shown).

The vehicle-mounted electronic device 4 has a control program adapted to be executed to perform, for example, a task C (FIG. 5) for calculating a velocity of the preceding vehicle and a vehicle-to-vehicle distance using the radar distance measuring equipment, and a task D (FIG. 5) for calculating a gear set and a throttle opening, on the basis of the preceding vehicle's velocity, the vehicle-to-vehicle distance, and the own velocity, so as to enable the vehicle to cruise after the preceding vehicle with the predetermined vehicle-to-vehicle distance kept therebetween.

The ROMs of the vehicle-mounted electronic devices 1, 2, 3, 4 store respectively therein the control programs described above. The OSs 10, 20, 30, 40 are each stored in a corresponding one of the ROMs, as described above. However, the OSs 10–40 may be incorporated in a one-chip CPU.

The OSs 10, 20, 30, 40 each constitute a distributed operating system (OS). Each of the vehicle-mounted electronic devices 1, 2, 3, 4 uses the distributed OS to perform data communication among the electronic devices 10–40. For controlling the data communication, a carrier sense multiple access with collision detection (CSMA/CD) system or a token-passing system may be employed. The distributed OS may have a function to perform process migration.

The DPRAMs 11, 21, 31, 41 each form a distributed shared memory storing therein at least shared data about vehicles including the own vehicle's velocity. Storage areas of the distributed shared memories are accessible from the CPUs of the respective vehicle-mounted electronic devices 1, 2, 3, 4.

An OS 80 (FIG. 6) of the vehicle-mounted electronic device 8 (electronic control unit for velocity—VEL ECU) and an OS 90 (FIG. 6) of the vehicle-mounted electronic device 9 (electronic control unit for navigation—NAV ECU) may form distributed OSs, and the respective memories of the vehicle-mounted electronic devices 8, 9 may form distributed shared memories.

Figure 2:
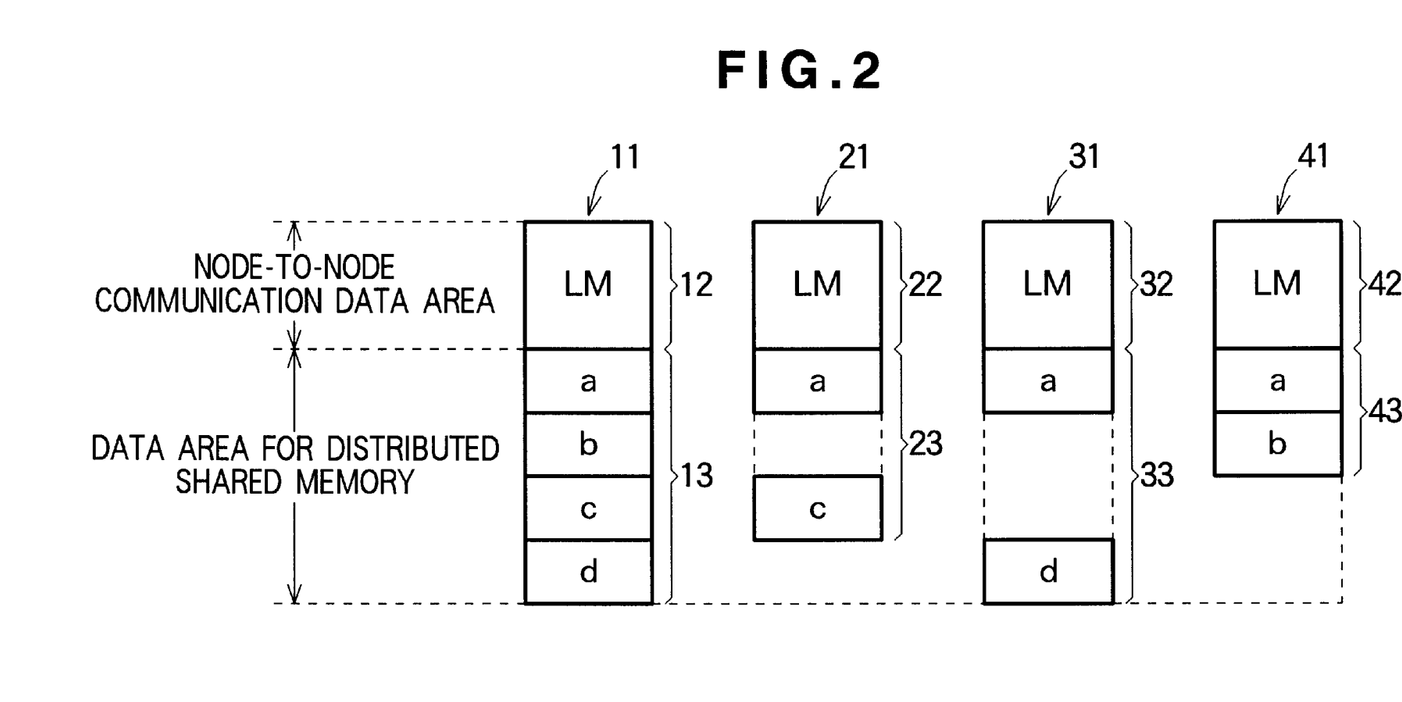
FIG. 2 is a view showing the structure of dual-port random access memories (DPRAMs) of the respective vehicle-mounted electronic devices shown in FIG. 1.

FIG. 2 shows the structure of the DPRAMs 11 41 of the respective vehicle-mounted electronic devices 1–4.

Each of the DPRAMs 11, 21, 31, 41 has a data area 12, 22, 32, 42 for node-to-node communication and a data area 13, 23, 33, 43 for distributed shared memory. The node-to-node communication data area 12, 22, 32, 42 stores therein data about general communication among nodes of the network system. The distributed shared memory data areas 13, 23, 33, 43 each form a distributed shared memory in which shared data about vehicles including the own velocity is stored. The data areas 13, 23, 33, 43 are accessible from the CPUs of the respective vehicle-mounted electronic devices 1, 2, 3, 4.

The DPRAMs 11, 21, 31, 41 each have an area a for the storage of various data items including the own velocity, travel distance, gear select position of automatic transmission, remaining fuel quantity, forward/backward acceleration, yaw rate, brake lamp condition, preceding vehicle's velocity, vehicle-to-vehicle distance and so on. An area b is used for the storage of data about fuel consumption. Similarly, an area C is used for the storage of data items concerning the engine r.p.m., gear select positions of automatic transmission, and so on. And, an area d is used or the storage of data about the accelerator's depression angle, throttle opening, and so on.

Thus, the same data is stored distributively in a portion of each of the respective memories of the vehicle-mounted electronic devices 1, 2, 3, 4 shown in FIG. 1.

Figure 3:
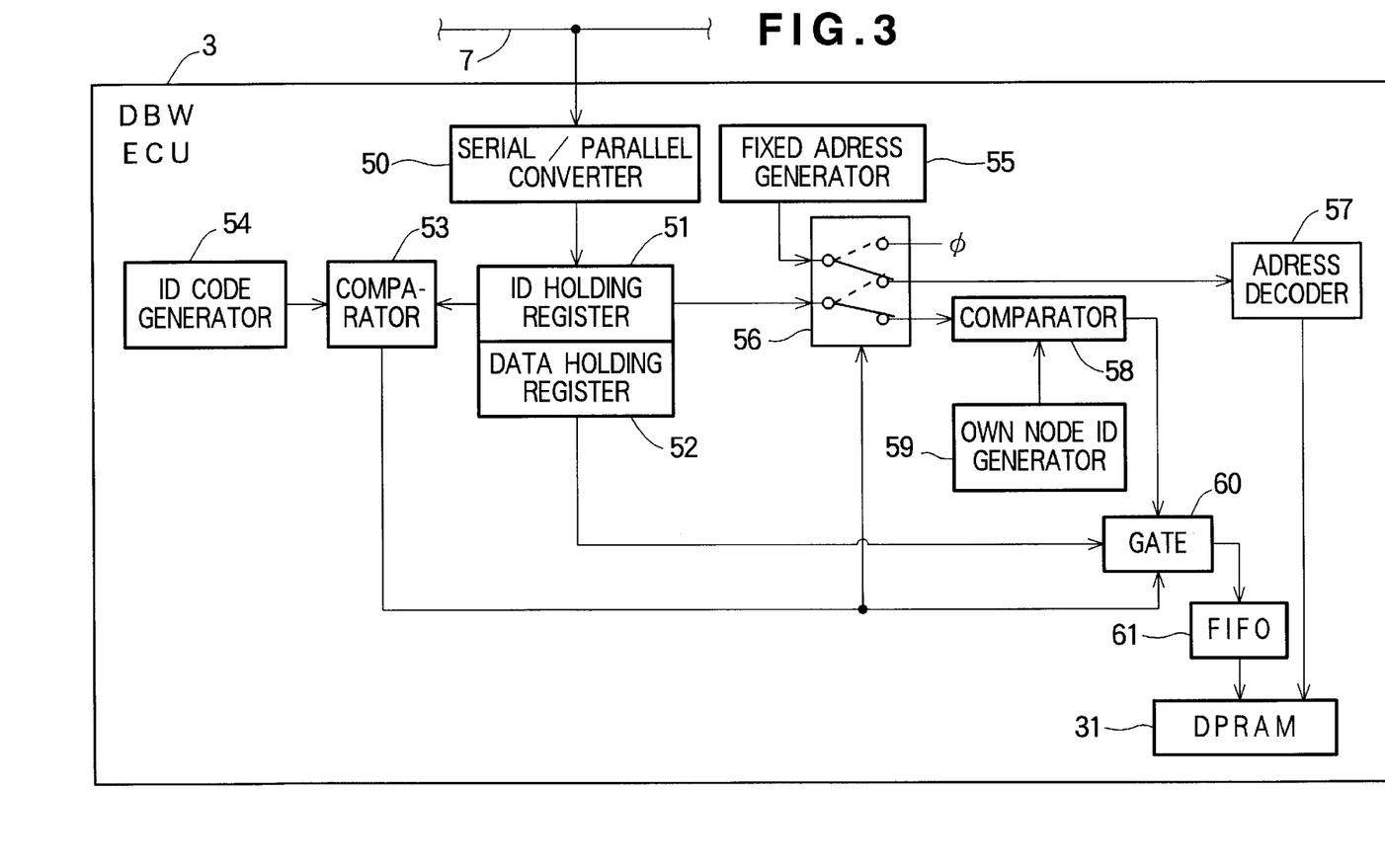
FIG. 3 is a block diagram illustrative of the manner in which data is written in the DPRAM of the vehicle-mounted electronic device for drive-by-wire (DBW)

FIG. 3 shows in block diagram the manner in which data is written in the memory of the vehicle-mounted electronic device 3.

The data sent or transmitted in serial transmission includes a frame (i.e., a group of bits transmitted as a unit) having a bit used for determination of the nature of the data, i.e., whether or not the transmitted data is to be stored in the distributed shared memory. The presence of the bit is checked to discriminate between data for the distributed shared memory and data about general node-to-node communication. Thus, the bit serves as a tag indicative of the nature of the data, i.e., whether or not the data is regarded as shared data.

The frame is arranged in accordance with a given format, and the frame format is composed of a start delimiter (SD), a frame controller (FC), A destination address (DA), a source or sender's address (SA), a data portion (DAT). a frame check sequence (FCS), and an end delimiter (ED). The destination address (DA) may be an identifier (ID) and a first bit thereof is used for making judgment or determination as to whether or not the transmitted data is data for the distributed shared memory.

If the transmitted data is data for the distributed shared memory, this data is written in one or more of the areas a–d of the DPRAM 31 (FIG. 2) in which instance the destination address (DA) indicates an address or location in the distributed shared memory. At the same time, the data is subjected to selection performed by an address decoder 57 so as not to permit entry or writing of the data in the unnecessary data area.

A serial-to-parallel converter 50 performs the serial-to-parallel conversion of transmitted signal elements when it detects the start delimiter (SD) of the frame. The parallel converted signal elements enable an ID holding register 51 to hold the destination address (DA). They also enable a data holding register 52 to hold the data portion (DAT) to be stored in the memory.

A comparator 53 compares the first bit of the address ID held in the ID holding register 51 with a data identification (ID) code output from an identification (ID) code generator 54, the ID code being assigned to indicate that the data is to be stored in the distributed shared memory.

If the address ID code and the data ID code (for the distributed shared memory) are not coincidental each other, a changeover switch 56 takes a position indicated by the solid lines shown in FIG. 3. Thus, an output signal from a fixed address generator 55 is supplied through the changeover switch 56 to an address decoder 57 and, at the same time, values represented by bits of the address ID other than the first bit are supplied from the ID holding register 51 through the changeover switch 56 to a comparator 58. The fixed address generator 55 outputs an address corresponding to one of the node-to-node communication data areas 12, 22, 32, 42 of the respective DPRAMs 11, 21, 31, 41 (FIG. 2).

The comparator 58 compares the ID signal from the changeover switch 56 with an own node identification (ID) signal output from an own node identification (ID) signal generator 59. If the ID signal from the changeover switch 56 is coincidental with the own node ID signal, a gate 60 consisting of an OR gate opens and thus permits an output signal from the data holding register 52 to be supplied to a first-in first-out (FIFO) 61. Conversely, if the ID signal from the changeover switch 56 is not coincidental with the own node ID signal, the gate 60 closes and thus blocks the output signal from the data hold register 52 from being supplied to the FIFO 61. This means that no data can be written unless it is addressed to the own node.

The FIFO 61 supplies the signal from the gate 60 to the DPRAM 31, and the address decoder 57 supplies a data storage address to the DPRAM 31.

If the address ID code and the data ID code (for the distributed shared memory) are coincidental each other, the comparator 53 outputs a coincidence signal. In accordance with this coincidence signal, the changeover switch 56 shifts from the solid-lined position to the broken-lined position shown in FIG. 3. Consequently, an output signal from the fixed address generator 55 is supplied via the changeover switch 56 to a floating-state terminal ($\phi$) of the changeover switch 56 and, at the same time, values represented by bits of the address ID other than the first bit are supplied from the ID holding register 51 through the changeover switch 56 to the comparator 58. The coincidence signal from the comparator 53 is supplied to the gate 60 and thus opens the gate 60 with the result that an output signal from the data holding register 52 is supplied through the gate 60 to the FIFO 61.

Thus, the data is written in the distributed shared memory at the location or address specified by the address ID.

Respective functions of the above-mentioned functional units 50–61 may be incorporated in the OS 33, and the serial-to-parallel converter 50 may be formed by hardware.

Figure 4:
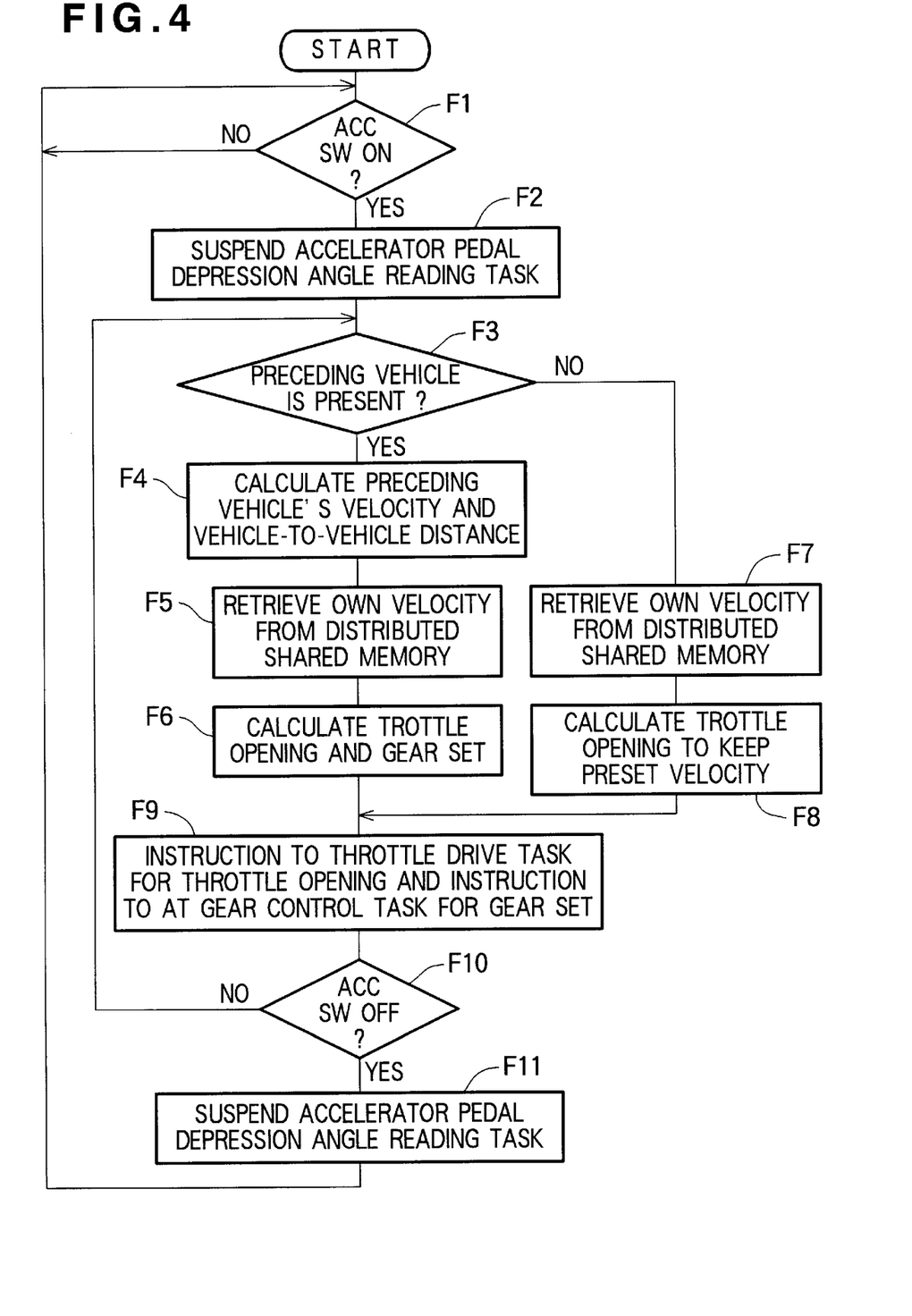
FIG. 4 is a flowchart showing part of a processing operation (task D) performed by the vehicle-mounted electronic device for adaptive cruise control.

Referring now to a flowchart shown in FIG. 4 and operation of the vehicle-mounted electronic devices 3 and 3 shown in FIG. 5, description will be given of the task D which is performed as a part of operation of the adaptive cruise control (ACC) task of the vehicle-mounted electronic device 4. In the illustrated embodiment, the program adapted to be executed to perform the task D is stored in the ROM of the vehicle-mounted electronic device 4, however, this program may be stored in the DPRAM, ROM or the like memory of any other vehicle-mounted electronic device 1, 2, 3.

A step F1 determines whether or not an operation switch for initiating the ACC function is in turned on. If the operation switch is in the ON state, the control procedure goes on to a step F2. Conversely, If the operation switch is in the OFF state, start of the ACC function is delayed until determination indicates the ON state of the operation switch.

The step F2 suspends an accelerator pedal depression angle reading task (task B of the vehicle-mounted electronic device 3) to thereby place the control procedure in a standby condition. This step is performed, for example, by executing a system call "sus_tsk(B)" of $\mu$TRON (commercial name) issued in the task D. In this condition, the task D has a higher level of access right than the task B (namely, the vehicle-mounted electronic device 4 has a higher level of access right than the vehicle-mounted electronic device 3).

Then, a step F3 determines whether or not there is a vehicle running ahead of the own vehicle. For this determination, the task C is executed with the assistance of the radar distance measuring equipment, for example. If there is no preceding vehicle, the control procedure advances to a step F7. Conversely, if the preceding vehicle is present, the control procedure goes on to a step F4 where a velocity of the preceding vehicle and a distance between the preceding vehicle and the own vehicle (vehicle-to-vehicle distance) are calculated by the task C.

Subsequently, a step F5 accesses the area a (FIG. 2) of the distributed shared memory to read out or retrieve a velocity of the own vehicle (own velocity).

Thereafter, a step F6 calculates, on the basis of the own velocity, the preceding vehicle's velocity and the vehicle-to-vehicle distance, a gear set and a throttle opening which are required for enabling the vehicle to cruise after the preceding vehicle with a predetermined vehicle-to-vehicle distance kept therebetween. Thus, the vehicle can cruise after the preceding vehicle while keeping optimum velocities and optimum vehicle-to-vehicle distances relative to the preceding vehicle.

At the step F7, the area a (FIG. 2) of the distributed shared memory is accessed to read out or retrieve therefrom an own velocity.

Subsequently, a step F8 calculates a throttle opening required to keep a preset cruising speed or velocity.

Then, a step F9 gives an instruction to the throttle drive task (task A of the vehicle-mounted electronic device 3) for realizing the calculated throttle opening. In other words, data about the calculated throttle opening is sent from the vehicle-mounted electronic device 4 to the vehicle-mounted electronic device 3. Additionally, the step F9 gives an instruction to the AT gear control task (task T2 of the vehicle-mounted electronic device 2 shown in FIG. 1) for realizing the calculated gear set. In other words, data about the gear set calculated by the vehicle-mounted electronic device 4 is sent to the vehicle-mounted electronic device 2. The instruction to the AT gear control task may be given only when the gear set is to be changed or when the control procedure reaches the step F9 through the step F6.

Thereafter, a step 10 determines whether or not the operation switch for ACC function is turned off. If the operation switch is in the ON state and the accelerator pedal is not depressed, the control procedure returns to the step F3. Conversely, if the operation switch is in the OFF state, or if the acceleration pedal is depressed, the control procedure goes on to a step F11.

The step F11 cancels suspension of the accelerator pedal depression angle reading task (task B of the vehicle-mounted electronic device 3) to thereby resume the task B. This cancellation is performed, for example, by executing a system call "rsm_tsk(B)" of μiTRON issued from the task D.

Thereafter, the control procedure returns to the step F1.

Figure 5:
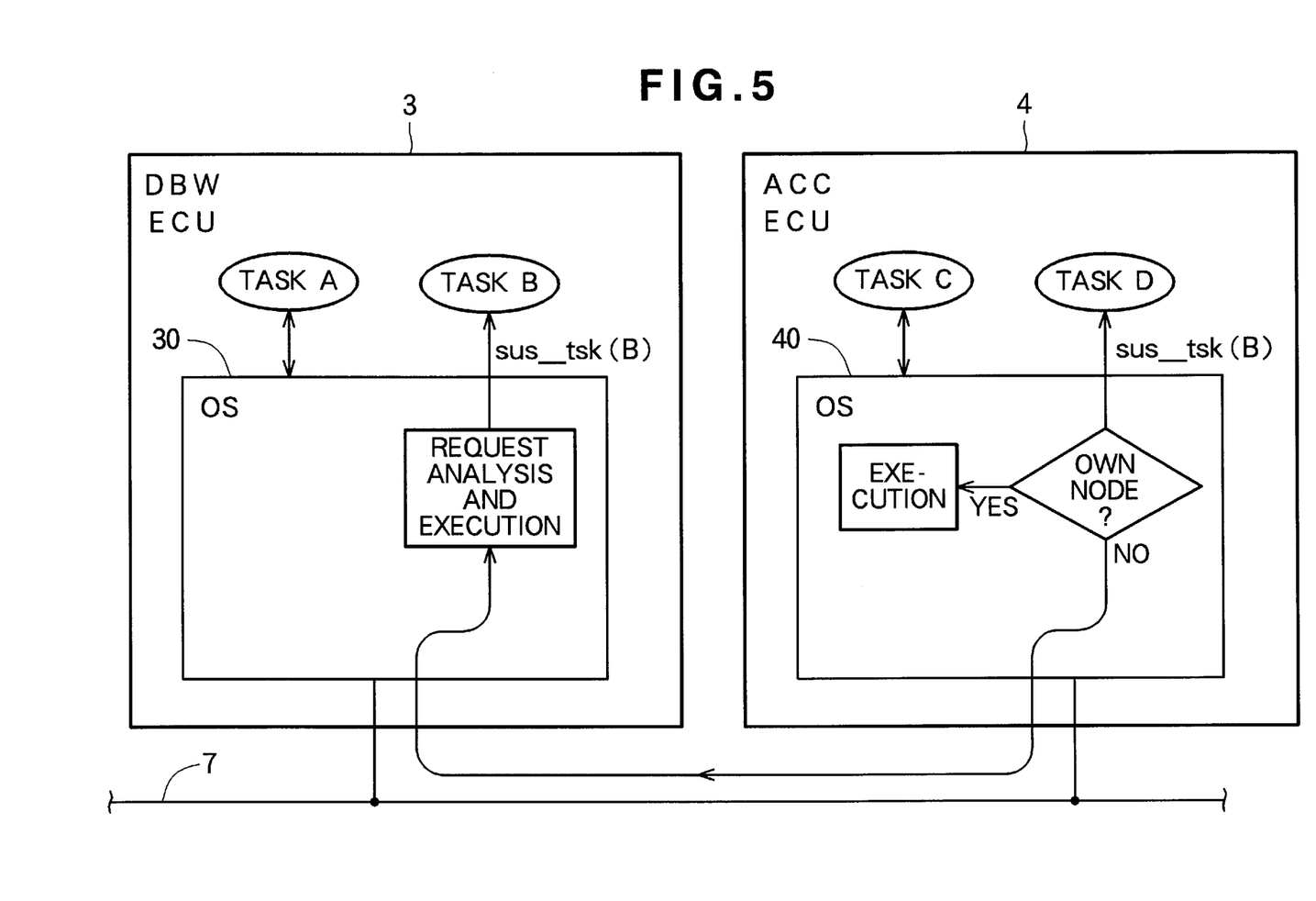
FIG. 5 is a block diagram showing the operation of the DBW vehicle-mounted electronic device and the ACC vehicle-mounted electronic device.

As described above, when the operation switch for activating the ACC function is turned on, the vehicle-mounted electronic device 4 outputs an instruction "sus_tsk(B)" for suspending the throttle opening calculating task B of the vehicle-mounted electronic device 3, as shown in FIG. 5. The electronic device 4 also sends to the throttle opening adjusting motor regulating task A. a target value corresponding to a throttle opening which produces a speed or velocity required for enabling the vehicle to cruise after the preceding vehicle. When the preceding vehicle slows down the speed, it may occurs that the necessary deceleration cannot be obtained only by full closing of the throttle. In this case, a target value indicative of the necessary gear set is sent to the gear set changing task T2 of the vehicle-mounted electronic device 2 (FIG. 1). In this instance, the gear set calculation task T1 may be suspended.

Transmission and receiving of the control data is achieved by using a function supported as a task-to-task communication function of the distributed OSs.

Figure 6:
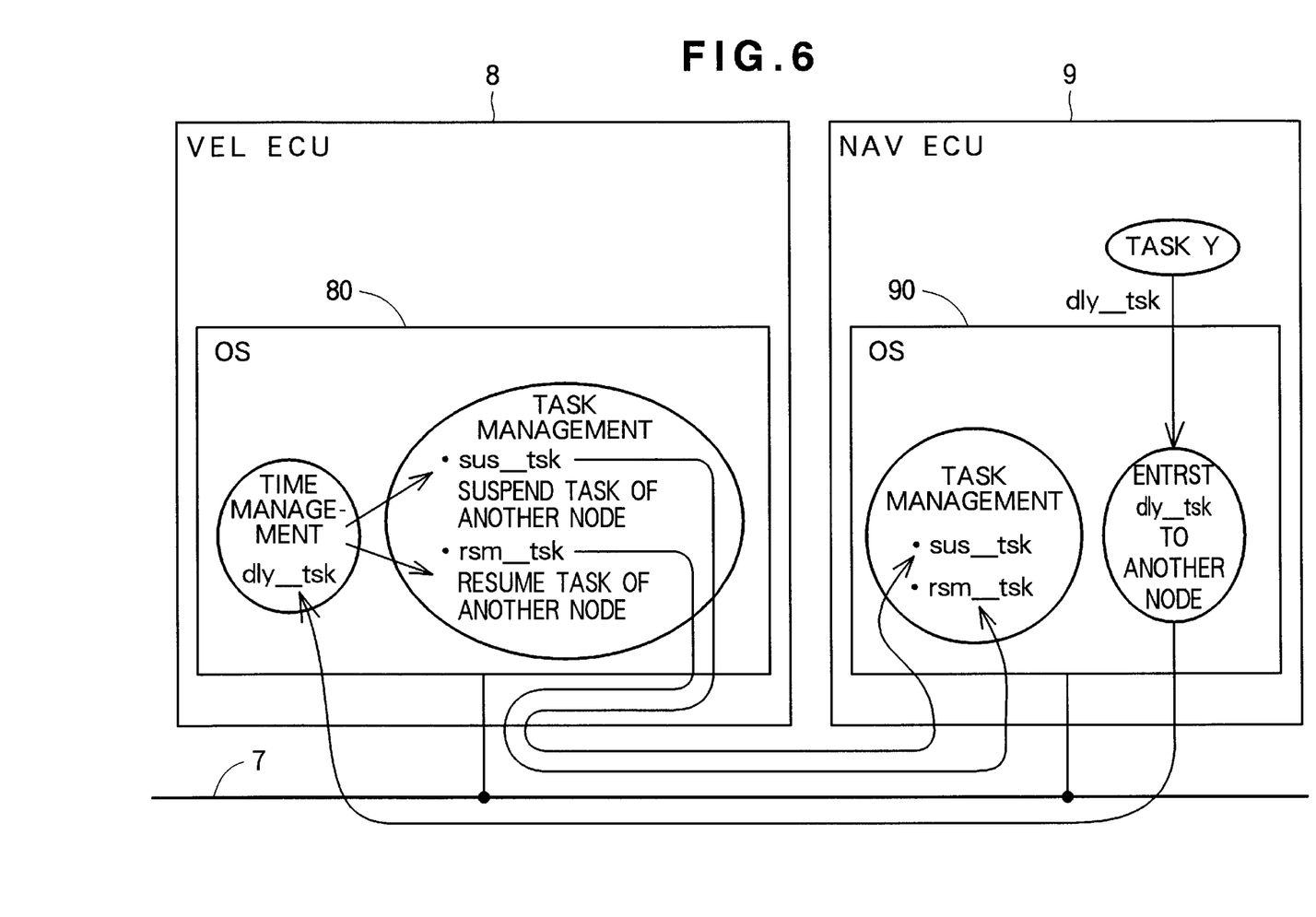
FIG. 6 is a block diagram showing an operation performed when an execution unit for a task delay system call is present in another node rather than the own node.

FIG. 6 illustrates the manner in which an execution unit for executing a task delay system call is supported by the OS in another node. In FIG. 6, the vehicle-mounted electronic device (VEL ECU) 8 and the vehicle-mounted electronic device (NAV ECU) 9 are shown in conjunction with the respective operations.

In the case where a system call function is not distributed or dispersed among the nodes (vehicle-mounted electronic devices), a task management function and a time management function are supported by the OS 80 in the same node. Conversely, if the system call function is distributed or dispersed among the nodes, the time management function can be transferred to another node.

With respect to a task delay system call "dly_tak" required by the task Y, if there is no execution unit provided within the own node (vehicle-mounted electronic device 9), another node containing an execution unit for the system call "dly_tsk" is entrusted via the network. The OS 80 in the entrusted node (vehicle-mounted electronic device 8) executes the system call "dly_tsk". In this instance, a system call "sus_tsk" and a system call "rsm_tsk" both addressed to the task Y are regarded as system calls from another node (vehicle-mounted electronic device 8), execution of these system calls is entrusted via the network to the OS 90 of the node (vehicle-mounted electronic device 9) in which the task Y is contained.

This arrangement makes it possible to minimize the number of execution unit provided for the system call "dly_tsk" and thus provides down-sizing because omission of hardware circuits (such as those for clock timer interruption and counter) including memories becomes possible. Thus, even in a small-sized node a large number of system calls can be dealt with, and so a program Can be prepared with a great degree of freedom.

Figure 7:
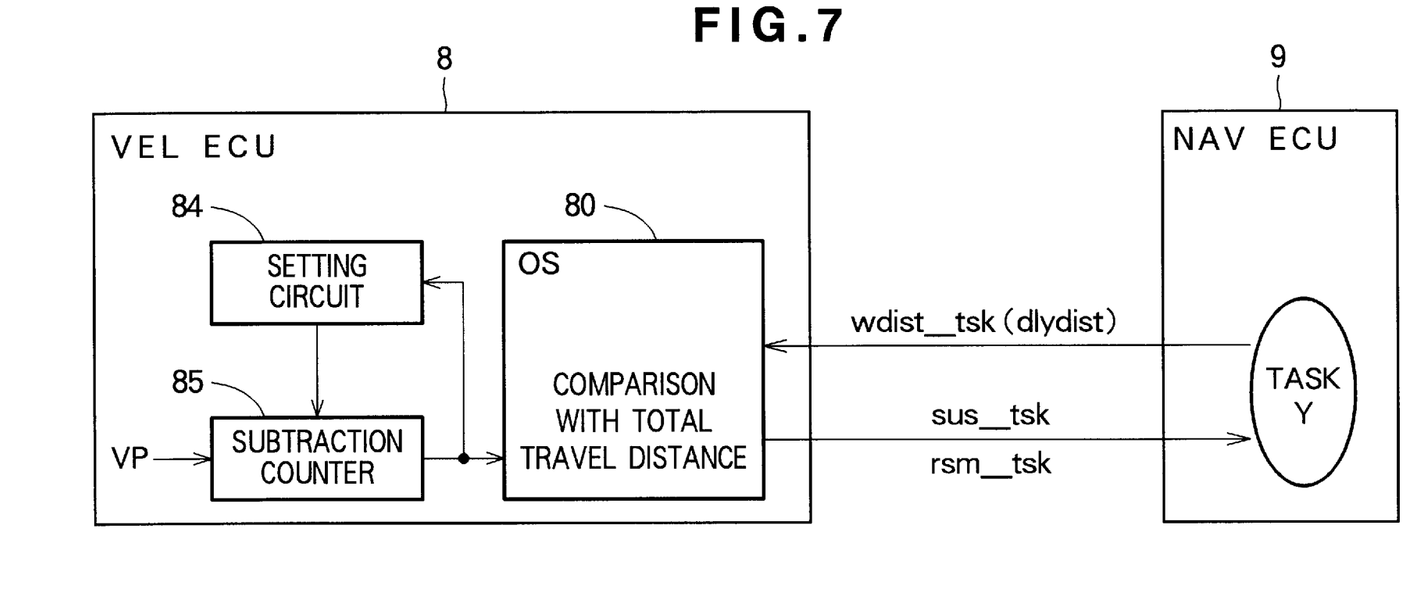
FIG. 7 is a block diagram showing an example of the execution unit for the task delay system call.

FIG. 7 exemplifies an execution unit for the task delay system call. In the illustrated example, a similar system call "dly_tsk(dlydist)" is used in place of the system call "dly_tsk" described above.

The system call "dly_tsk(dlydist)" is a system call used for suspending execution of the specified task for a time during which the vehicle travels over a distance specified by a parameter "dlydist".

In response to the system call "dly_tsk(dlydist)" issued from the task Y, the OS 80 enables a necessary function to output a system call "sus_tsk" from the vehicle-mounted electronic device 8 to the OS 90 (FIG. 6) in the task Y (vehicle-mounted electronic device 9).

Each time the vehicle travels over a predetermined unit travel distance L, one vehicle-travelling pulse VP is supplied to a subtraction counter 85. When a count on the counter 86 becomes; zero (0), this moment is detected by a setting circuit 84 and, upon this detection, a specified number of count is automatically set on the subtraction counter 84 by means of the setting circuit 84.

On the basis of a count on the subtraction counter 86, the OS 80 executes a control subroutine to calculate a total travel distance. When the calculated total travel distance is equal to the travel distance specified by the parameter "dlydist", the OS 80 performs a control function to output a system call "rsm_tsk" from the vehicle-mounted electronic device 8 to the task Y (vehicle-mounted electronic device 9) to thereby resume the task Y.

In a program used for the control of vehicles or incorporated in vehicle-mounted navigation system, a process is frequently used. This process is can generate executed each time the vehicle travels over a predetermined unit travel distance or at uniform intervals of travel. A typical example of such process is a starting period or cycle of a guidance task performed in the vehicle-mounted navigation system.

Conventionally, the vehicle-travelling pulse VP generates an interrupt to start execution of a given task of an interrupt routine. Because the interrupt routine is prepared as part of an application program each time programming is effected, the flexibility of the interrupt routine is relatively low, Accordingly, it occurs likely that the interrupt falls to accommodate a revision made to the original program.

According to the present invention, the vehicle-mounted operating system supports a system call having a parameter assigned to the travel distance or the velocity of the vehicle. The system call requires no modification even when the original program is revised, and it can be used from another node.

Furthermore, since the task start timing is shown in a list as a program code, the configuration of the program can readily be understood. The program can, therefore, be maintained easily. Additionally, development works for the vehicle-mounted electronic devices is achieved smoothly and efficiently.

It is possible according to the present invention to change the content of the process according to the running velocity (own velocity). Additionally, a task start system call "stpd_tak(takid,speed)" may be used to perform a process which becomes necessary when the own velocity exceeds a predetermined value. More specifically, when the own velocity exceeds a running velocity specified by the parameter "speed", a task specified by the parameter "tskid" (such as a task for automatically locking the vehicle doors) is executed.

The operations in the above-mentioned application are achievable even when the vehicle-mounted network system is not equipped with the distributed operating system. In this instance, however, a sequence of operations corresponding to instructions issued from one vehicle-mounted electronic device must be written in advance in the program of any other vehicle-mounted electronic device. Such programming, however, cannot properly deal with the entry of a new vehicle-mounted electronic device developed after the existing electronic devices.

Figure 8:
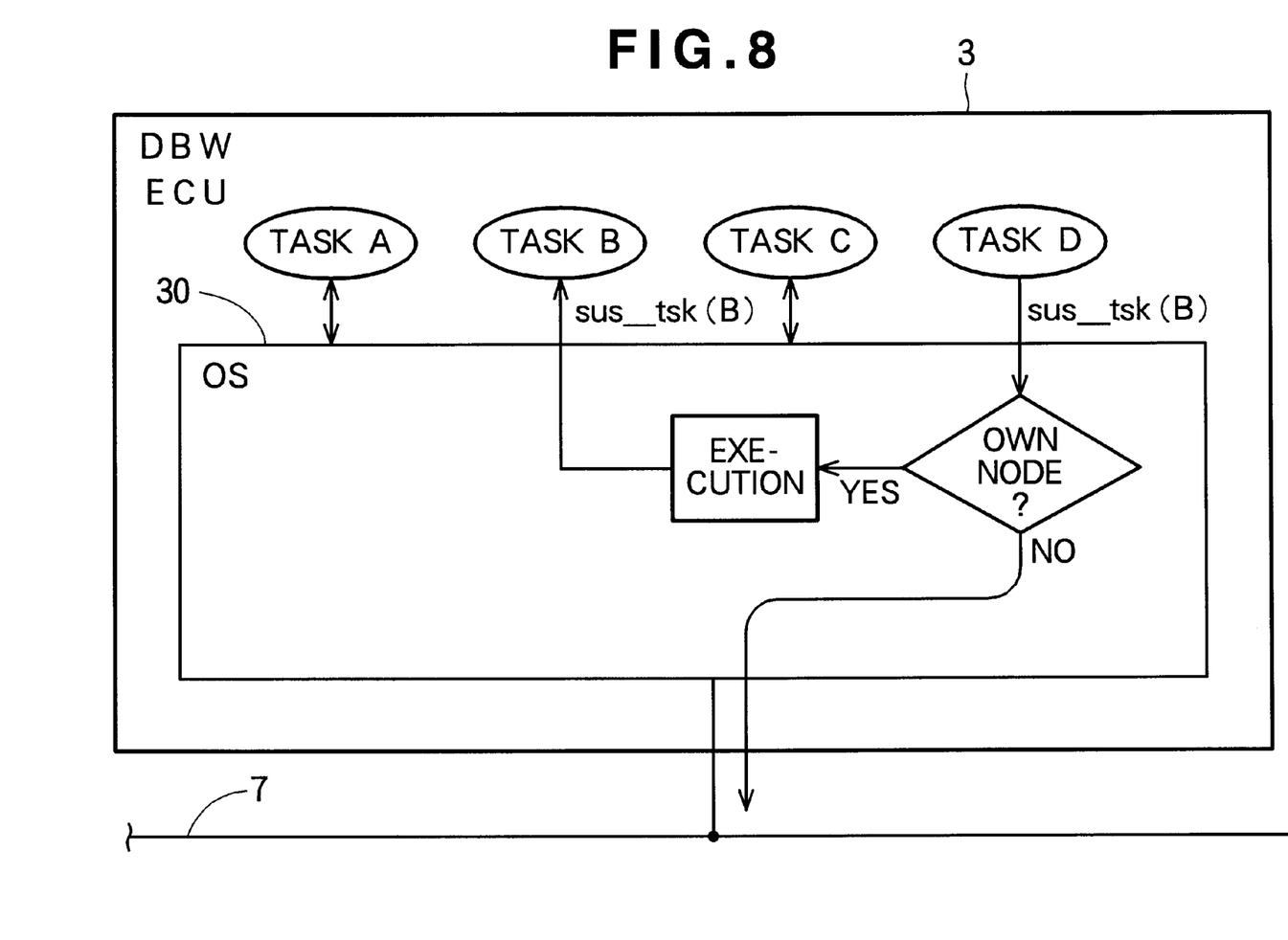
FIG. 8 is a block diagram showing an operation performed in an electronic device formed by the ACC vehicle-mounted electronic device integrated with the DBW vehicle-mounted electronic device.

To cope with this problem, the vehicle-mounted electronic device 3 and the vehicle-mounted electronic device 4, for example, may be integrated into a single vehicle-mounted electronic device, as shown in FIG. 8. The integrated vehicle-mounted electronic device can operate under the control of one and the same CPU without requiring any revision to the program of each vehicle-mounted electronic device 8, 9.

In FIG. 8, the data transmission through the serial transmission bus 7 is performed by the distributed OS. Accordingly, the task D can start and stop execution of the task B by giving an instruction to the distributed OS regardless of the location of the task B because the distributed OS gives an instruction to the OS 30 of the vehicle-mounted electronic device 3 where the task B is located. In a network system not equipped with the distributed OS, the program is dependent on the configuration of hardware.

The distributed OS is an OS intended to provide a system with high distribution transparency by renewing the design of the entire OSs. According to the control system, the distributed OS is classified into two groups; one being of the centered control type and the other being of the distributed control type. Either type of distributed OS may be used in this invention.

The centered control type distributed OS forms a global OS having structural elements consisting of respective OSs of the computer in the entire system. In other words, the system has one global OS, and a central portion or core of the global OS controls the OSs of the distributed computers to thereby realize a distribution transparent environment.

The distributed control type distributed Os has no central control element in the system. The OSs of the respective computers are the same in nature and equal in power or level. All the OSs may have the same program (including a task management program).

An arrangement may be taken in which data about the own velocity, preceding vehicle's velocity and vehicle-to-vehicle distance are stored in two or more of the vehicle-mounted electronic devices, and a plurality of copies of the data are stored in another vehicle-mounted electronic device. With this arrangement, the ACC function can be kept alive with high possibility even when one of the vehicle-mounted electronic device is damaged or encounters a communication failure.

Furthermore, by preparing a copy of the data provided in a data access microcomputer or its peripheral unit, response time and communication cost required for the access to the data are considerably reduced. The copies of the data placed in the different vehicle-mounted electronic devices permit parallel access to the data and thus insure parallel processing of the ACC function.

Obviously, various minor changes and modifications of the present invention are possible in the light of the above teaching. It is therefore to be understood that within the scope of the appended claims the invention may be practiced otherwise than as specifically described.

What is claimed is:

1. A network system for a vehicle comprising:
   a plurality of electronic devices mountable on the vehicle and interconnected by a transmission line, each of said vehicle-mounted electronic devices having a microcomputer; and
   a distributed operating system having functions assigned distributively to the respective microcomputers of said vehicle-mounted electronic devices to perform data communication and distributed processes among said vehicle mounted electronic devices.

2. A network system according to claim 1, wherein said operating system comprises a system call containing a parameter assigned to a travel distance of the vehicle.

3. A network system according to claim 1, wherein said operating system comprises a system call containing a parameter assigned to a running velocity of the vehicle.

4. A network system for a vehicle, comprising:
   a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, wherein data about vehicles including the own velocity of the vehicle are routed within the network system, with tags indicating shared data being affixed to the data, and stored in respective internal memories in said microcomputers of the vehicle-mounted electronic devices, thus enabling said internal memories to form virtual distributed shared memories.

5. A network system for a vehicle, comprising:
   a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, and distributed shared memories for storing therein at least shared data about vehicles including the own velocity of the vehicle, said distributed shared memories having respective predetermined storage areas accessible from said vehicle-mounted electronic devices.

6. A network system for a vehicle, comprising:

a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, wherein said distributed operating system deals with a system call from another task invoking a change in the state of an owned task such that said system call becomes effective only when said another task has a higher level of access right than said own task.

7. A network system for a vehicle, comprising:

a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, wherein said distributed operating system deals with a system call from another node invoking a change in the state of a task in the own node such that said system call becomes effective only when said another node has a higher level of access right than the own node.

8. A network system for a vehicle, comprising:

a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, wherein said distributed operating system has a system call function assigned distributively to each node of said network system.

9. A network system for use in a vehicle having an adaptive cruise control function, comprising:

a plurality of electronic devices mountable on the vehicle and interconnected by a transmission channel, each of said vehicle-mounted electronic devices having a microcomputer and containing a distributed operating system for performing data communication and distributed processes among said vehicle-mounted electronic devices, wherein said network system further has distributed shared memories for storing therein at least shared data about vehicles including the own velocity of the vehicle, wherein one of said vehicle-mountable electronic devices is capable of calculating at least a velocity of the preceding vehicle and a vehicle-to-vehicle distance between the vehicle and the preceding vehicle, and wherein said one vehicle-mountable electronic device stores data about the calculated preceding vehicle's velocity and a vehicle-to-vehicle distance in said distributed shared memories to secure access to the data from any other vehicle-mountable electronic device, and is capable of performing distributed processes to calculate, on the basis of the own velocity, preceding vehicle's velocity and vehicle-to-vehicle distance stored in said distributed shared memories, a gear set and a throttle opening both required for enabling the vehicle to cruise after the preceding vehicle with a predetermined vehicle-to-vehicle distance kept between itself and the preceding vehicle.

* * * * *